US008793709B2

(12) United States Patent
Bishop

(10) Patent No.: US 8,793,709 B2
(45) Date of Patent: Jul. 29, 2014

(54) DYNAMIC DATA COORDINATION BETWEEN MULTIPLE APPLICATIONS

(75) Inventor: Matthew Bishop, North Vancouver (CA)

(73) Assignee: SAP France S.A., Paris (FR)

( * ) Notice: Subject to any disclaimer, the term of this patent is extended or adjusted under 35 U.S.C. 154(b) by 1421 days.

(21) Appl. No.: 12/275,144

(22) Filed: Nov. 20, 2008

(65) Prior Publication Data

US 2010/0125859 A1 May 20, 2010

(51) Int. Cl.
*G06F 13/00* (2006.01)
*G06F 9/46* (2006.01)
*G06F 9/54* (2006.01)

(52) U.S. Cl.
CPC ............... *G06F 9/542* (2013.01); *G06F 9/543* (2013.01); *G06F 2209/545* (2013.01)
USPC .......................................... 719/329; 719/319

(58) Field of Classification Search
CPC .... G06F 9/542; G06F 9/543; G06F 2209/545
USPC .................................................. 719/319, 329
See application file for complete search history.

(56) References Cited

U.S. PATENT DOCUMENTS

| 5,404,523 | A | * | 4/1995 | DellaFera et al. | 718/101 |
|---|---|---|---|---|---|
| 5,991,751 | A | * | 11/1999 | Rivette et al. | 1/1 |
| 6,014,644 | A | * | 1/2000 | Erickson | 705/37 |
| 8,280,984 | B2 | * | 10/2012 | Lance et al. | 709/219 |
| 2003/0140156 | A1 | * | 7/2003 | Karim | 709/231 |
| 2003/0169295 | A1 | * | 9/2003 | Becerra, Jr. | 345/765 |
| 2004/0002944 | A1 | * | 1/2004 | Hauser et al. | 707/1 |
| 2004/0216135 | A1 | * | 10/2004 | Heimbeck | 719/318 |
| 2006/0015897 | A1 | * | 1/2006 | Kim | 725/33 |
| 2006/0070083 | A1 | * | 3/2006 | Brunswig et al. | 719/318 |
| 2008/0141274 | A1 | * | 6/2008 | Bhogal et al. | 719/313 |
| 2010/0202339 | A1 | * | 8/2010 | Chieng et al. | 370/312 |

* cited by examiner

*Primary Examiner* — Emerson Puente
*Assistant Examiner* — Willy W Huaracha
(74) *Attorney, Agent, or Firm* — Mintz Levin Cohn Ferris Glovsky and Popeo, P.C.

(57) ABSTRACT

A computer readable storage medium includes executable instructions to receive input from a user at a first application. The executable instructions include instructions to route the input to a client module, route the input from the client module to a broadcast module and route the input from the broadcast module to a second application. The executable instructions further include instructions to display the input in a first user interface panel associated with the first application and simultaneously display in a second user interface panel associated with the second application information derived from the input.

15 Claims, 9 Drawing Sheets

DYNAMIC DATA COORDINATION BETWEEN MULTIPLE APPLICATIONS

FIELD OF THE INVENTION

The invention relates generally to data coordination and more particularly to a technique to coordinate the dynamic computation and display of data within multiple applications.

BACKGROUND OF THE INVENTION

Users of computer systems typically interact with multiple applications such as word processing applications, spread sheet applications, graphics applications, email applications, reports and web applications. An application typically includes a set of computer programs and associated data files that perform an integrated set of functions for a user and enable the user to accomplish a specific task. Input to the application is typically received from a user who interacts with the application via a user interface. Each application processes data specific to the application and assembles textual and graphical data for display to the user.

In certain situations, it is desirable for a user to interact with multiple applications displayed in a user interface. It would be desirable to develop a technique to dynamically coordinate a user's data interactions with the multiple applications. It would also be desirable to dynamically display data computations resulting from a user's data interactions with the multiple applications.

SUMMARY OF THE INVENTION

A computer readable storage medium includes executable instructions to receive input from a user at a first application. The executable instructions include instructions to route the input to a client module, route the input from the client module to a broadcast module and route the input from the broadcast module to a second application. The executable instructions further include instructions to display the input in a first user interface panel associated with the first application and simultaneously display in a second user interface panel associated with the second application information derived from the input.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
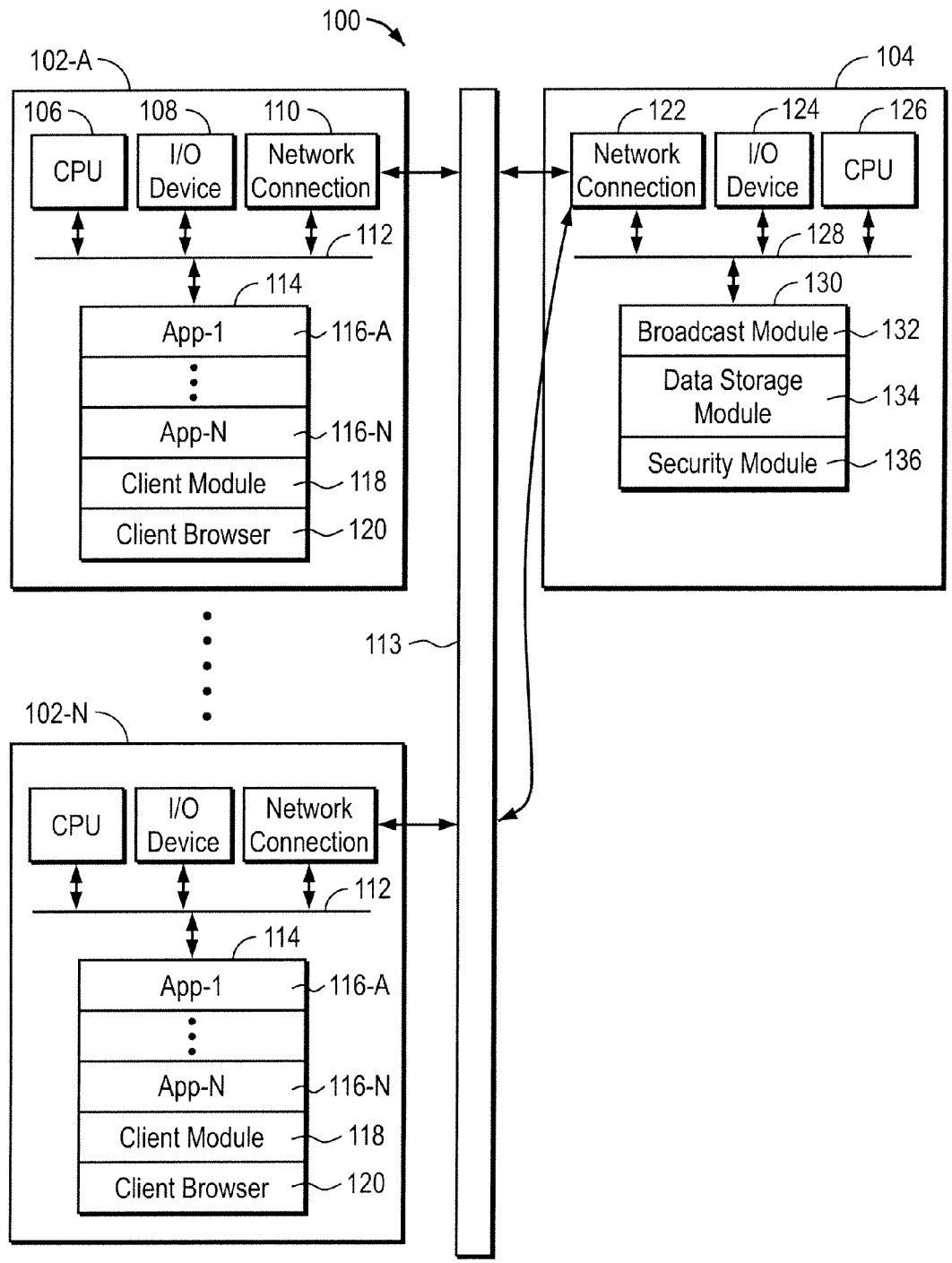
FIG. 1 is an illustration of a network configured to facilitate dynamic data coordination between multiple applications, in accordance with one embodiment of the invention.

FIG. 1 is an illustration of a network configured to facilitate dynamic data coordination between multiple applications, in accordance with one embodiment of the invention. The network 100 includes one or more client computers 102-A . . . 102-N connected to a server computer 104 via a communication channel 113, which may be any wired or wireless communication channel. The client computers 102-A . . . 102-N include standard components, such as a central processing unit 106, input/output devices 108 and a network connection circuit 110, which are linked by a bus 112. The network connection circuit 110 provides connectivity to the communication channel 113, thereby allowing the client computers 102-A . . . 102-N to operate in a networked environment.

A memory 114 is connected to the bus 112. The memory 114 includes executable instructions to support operations associated with embodiments of the present invention. In one embodiment, the memory 114 includes one or more applications, 116A . . . 116N, a Client Module 118 and a Client Browser 120. Each application 116A . . . 116N includes a set of computer programs and associated data files that perform an integrated set of functions for a user and enable the user to accomplish specific tasks. In one embodiment, the applications include, but are not limited to, word processing applications, spread sheet applications, graphics applications, email applications, report applications and web applications. Web applications may include, for example, date/time applications configured to display the current day and time, map applications configured to display location information about a particular city, weather applications configured to provide information about the weather within a particular city or financial applications configured to retrieve financial information associated with a particular corporation.

The Client Module 118 includes executable instructions to store metadata characterizing a user. In one embodiment, the metadata includes one or more data entry fields and their corresponding values. In a particular embodiment, the data entry fields store information such as the time, date, location and format preferences corresponding to a user.

The Client Browser 120 includes executable instructions to store input received from a user at an application. The Client Browser 120 further includes executable instructions to display the input in a user interface panel associated with the application.

The server computer 104 also includes standard components, such as a network connection circuit 122, input/output devices 124 and a central processing unit 126, which are linked via a bus 128. A memory 130 is connected to the bus 128. The memory 130 includes executable instructions to support operations associated with embodiments of the present invention. In one embodiment, the memory 130 includes a Broadcast Module 132, a Data Storage Module 134 and a Security Module 136.

The Broadcast Module 132 includes executable instructions to store metadata characterizing a set of users. The metadata includes one or more data entry fields and their corresponding values stored for the set of users. The Data Storage Module 134 stores inputs received from one or more users at one or more applications. The Security Module 136 stores security permissions associated with a set of users.

An application 116-A receives input from a user. The application 116-A routes the input to the Client Module 118. The input is displayed in a first user interface panel associated with the application, via the Client Browser 120. The Client Module 118 routes the input to the Broadcast Module 132. The Broadcast Module 132 routes the input received from the Client Module 118 to one or more of the applications 116-A . . . 116-N. The Client Browser 120 simultaneously displays in a second user interface panel associated with a second application information derived from the input. In certain embodiments, the Broadcast Module 132 routes the input to one or more of the client computers 102-A . . . 102-N associated with the user. In another embodiment, the Broadcast Module 132 routes the input to one or more users in accordance with the security permissions in the Security Module 136. The interactions between the various executable modules are discussed in greater detail with respect to FIGS. 2-4 below.

It should be noted that the executable modules stored in memory 114 and memory 130 are exemplary. Additional modules, such as an operating system or graphical user interface module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and or server-side. It is the functions of the invention that are significant, not where they are performed or the specific manner in which they are performed.

Figure 2:
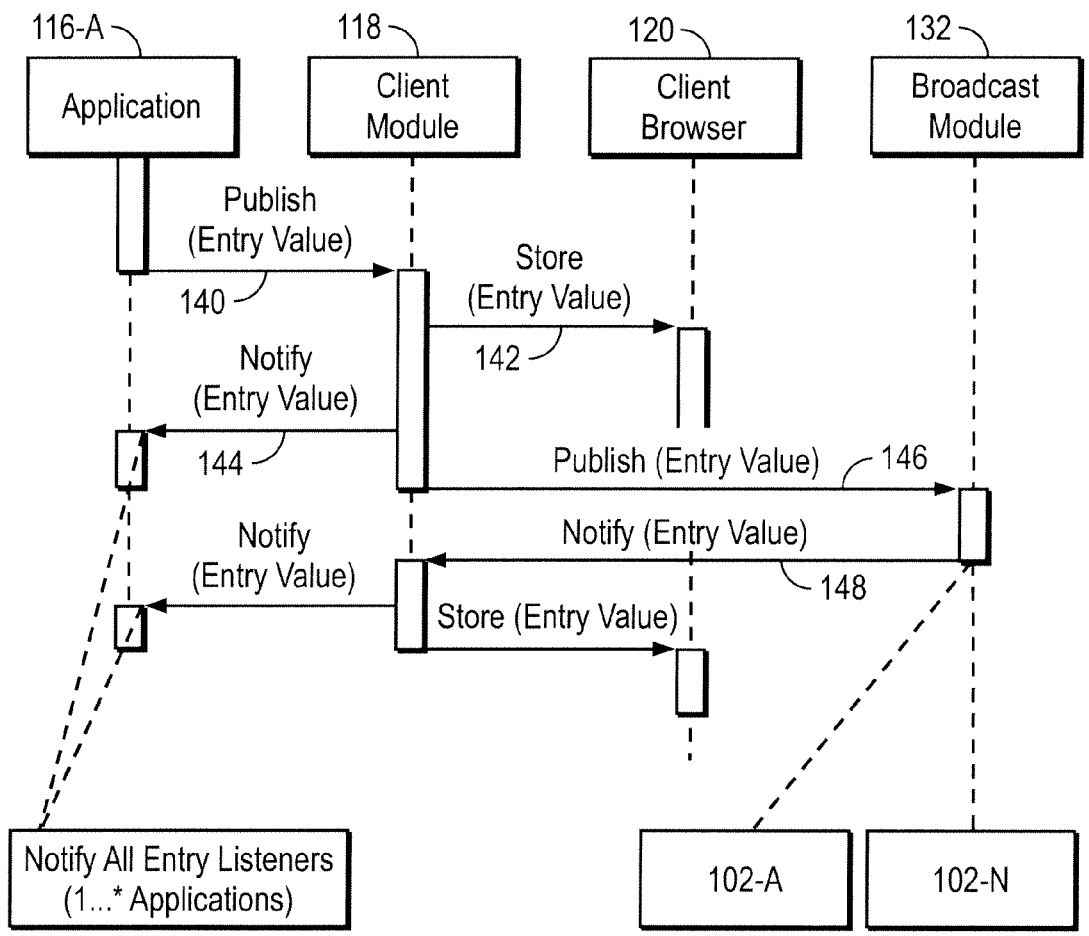
FIG. 2 illustrates an exemplary sequence of operations performed when input is received from a user at a first application.

FIG. 2 illustrates an exemplary sequence of operations performed when input is received from a user at a first application. An entry value (e.g., an input) received from a user at a first application, 116-A is routed to the Client Module 118 via a publication message, "publish (entryValue)" 140. The Client Module 118 initiates a "store (entryValue)" 142 command to store the entry value in the Client Browser 120. The Client Browser 120 includes executable instructions to display the entry value in a first user interface panel associated with the first application 116-A. The Client Module 118 then sends a notification message, "notify(entryValue)" 144, to notify all the applications that have requested subscription to the entry value of the new/updated entry value. In one embodiment, the applications include at least a second application and a third application. In a particular embodiment, the Client Browser 120 includes executable instructions to simultaneously display in a second user interface panel associated with the second application information derived from the input.

In certain embodiments, additional input may be received from a user at the third application. The additional input is combined with the input in the first application to generate combined input. A sequence of operations similar to those discussed above are then performed to simultaneously display in the second user interface panel associated with the second application information derived from the combined input.

Returning to FIG. 2, the Client Module 118 separately routes the entry value (i.e., input from the user) to the Broadcast Module 132 via a publication message, "publish (entryValue)" 146. The Broadcast Module 132 routes the entry value to all applications that have requested subscription to the entry value, via a "notify (entryValue)" 148 message to the Client Module 118. The Broadcast Module 132 also routes the entry value to one or more of the client computers, 102-A . . . 102-N, associated with the user. Executable modules in the client computers include executable instructions to display the input received from the Broadcast Module 132 in a first user interface associated with a first application. Executable modules in the client computers further include executable instructions to simultaneously display information derived from the input in a second user interface panel associated with a second application. In certain embodiments, the Broadcast Module 132 also includes executable instructions to route the input to one or more other users in accordance with the security permissions stored in the Security Module 136.

Figure 3:
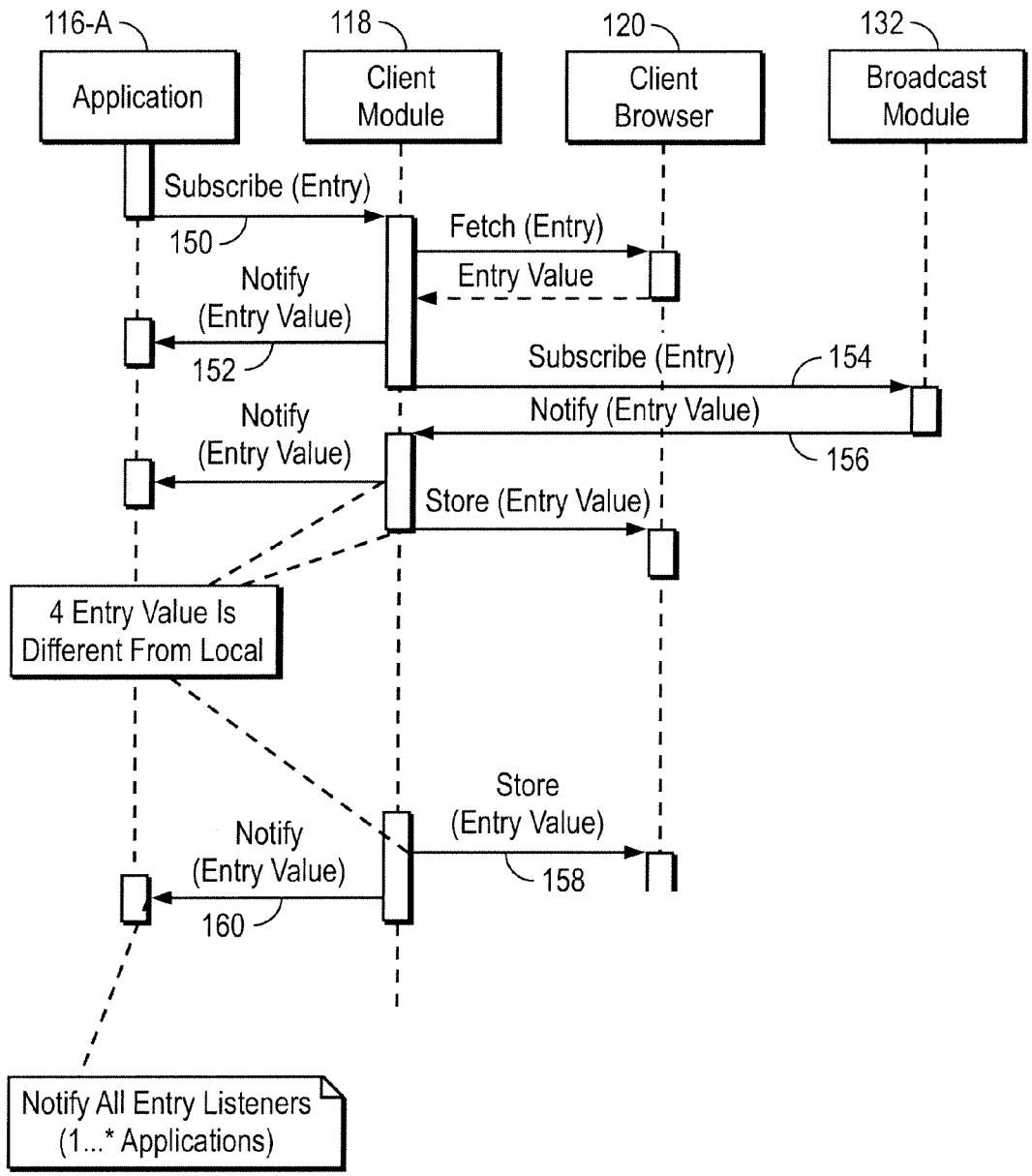
FIG. 3 illustrates an exemplary sequence of operations performed to service an online subscription request from an application.

FIG. 3 illustrates an exemplary sequence of operations performed to service an online subscription request from an application. An application 116-A subscribes to data entries (e.g., inputs) from a user, by sending a subscription request message, "subscribe(entry)" 150 to the Client Module 118. The Client Module 118 issues a "fetch(entry)" command to the Client Browser 120 to retrieve the entry values stored for the user. The Client Browser 120 returns the stored entry value to the Client Module 118. The Client Module 118 sends the entry value to application 116-A requesting subscription to the entry value via a notification message, "notify(entryValue)" 152.

The Client Module 118 also separately communicates with the Broadcast Module 132 to receive entry values corresponding to a user. Specifically, the Client Module 118 sends a subscription request message, "subscribe(entry)" 154 to the Broadcast Module 132. The Broadcast Module 132 sends the entry value to the Client Module 118 via a notification message, "notify(entryValue)" 156.

The Client Module 118 then performs an operation to determine if the entry value received from the Broadcast Module 132 is different from the entry value stored in the Client Browser 120. If so, the Client Module 118 issues a "store (entryValue)" command 158 to the Client Browser 120 to store the new/updated value of the entry value and sends the new/updated entry value to all the applications that have requested subscription to the entry value via a notification message, "notify(entryValue)" 160.

Figure 4:
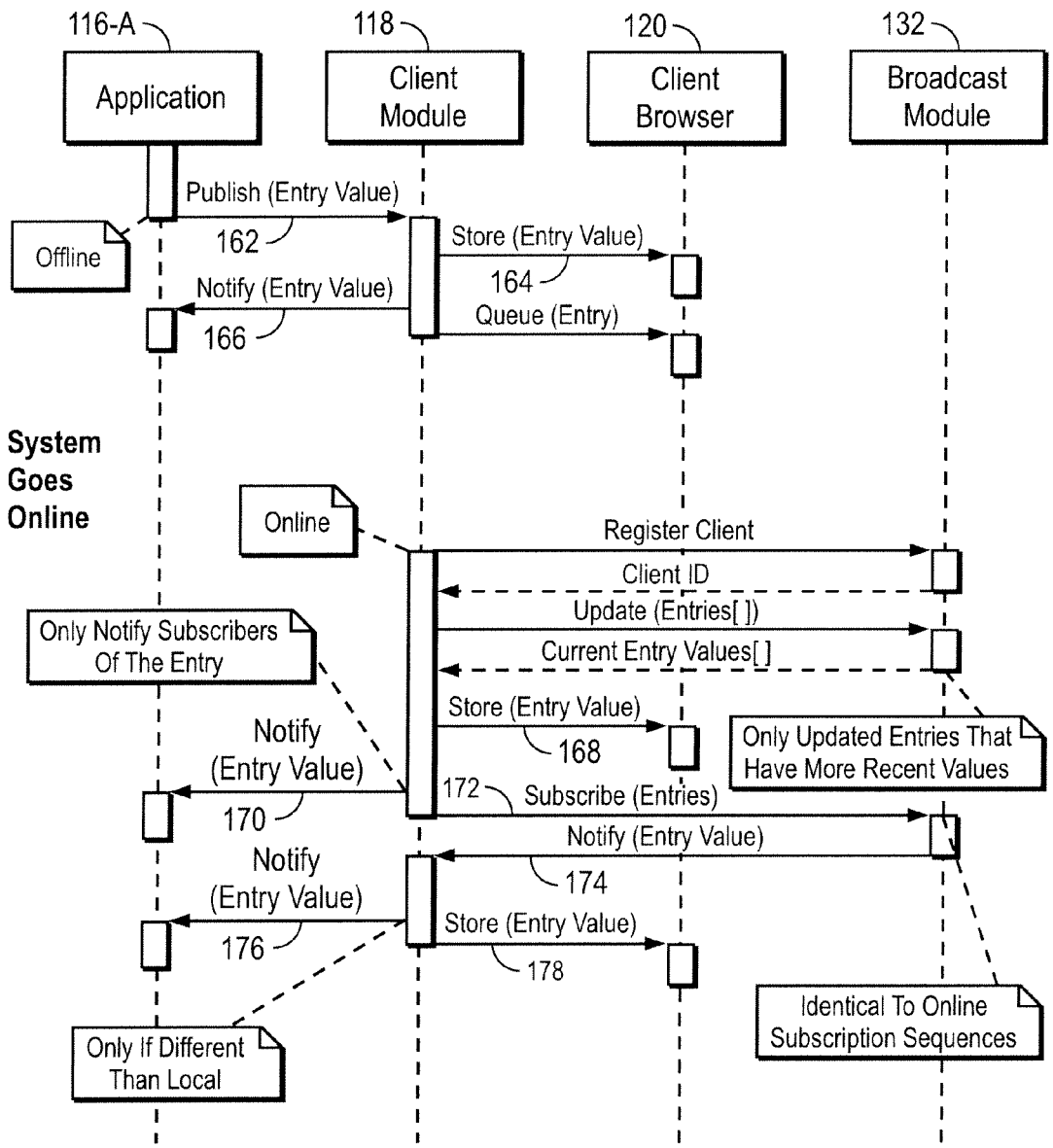
FIG. 4 illustrates an exemplary sequence of operations performed when an offline request is received from a user's client computer.
Figure 5:
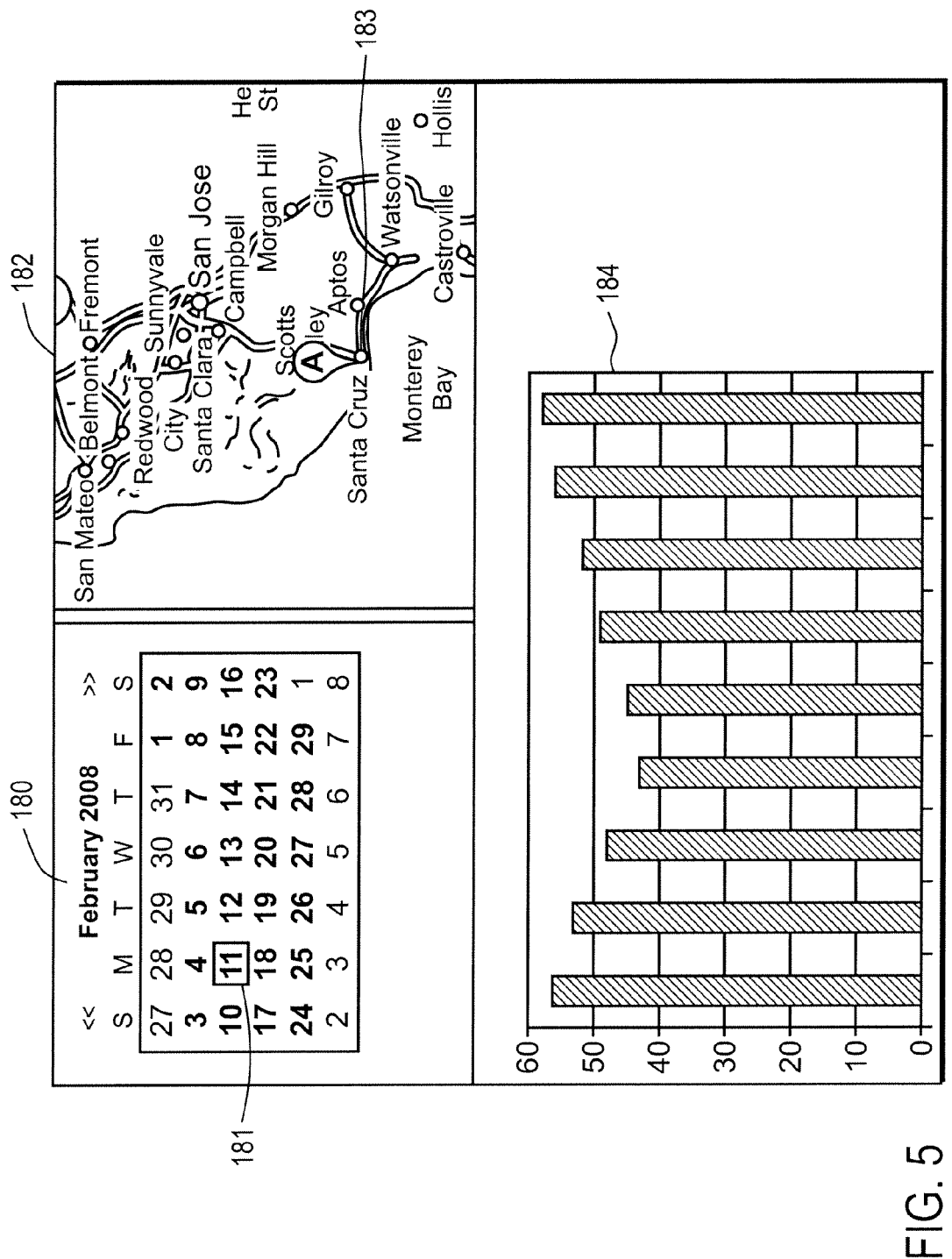
FIGS. 5-9 are exemplary screen displays illustrating dynamic data coordination between multiple applications displayed in a user interface, in accordance with embodiments of the present invention.

FIG. 4 illustrates an exemplary sequence of operations performed when an offline request is received from a user's client computer. An entry value (e.g., an input) received from a user at a first application, 116-A is routed to the Client Module 118 via a publication message, "publish (entryValue)" 162. The Client Module 118 initiates a "store (entryValue)" 164 command to store the entry value in the Client Browser 120. The Client Module 118 then sends a notification message, "notify(entryValue)" 166, to all the applications that have requested subscription to the "entryValue" of the new/updated entry value. The Client Module 118 initiates a "queue(entry)" command to the Client Browser 120.

When the user's client computer, 102-A goes online, it initiates a "registerClient" operation with the Broadcast Module 132 to register the client computer 102-A with the server computer 104. The Broadcast Module 132 returns a "clientID" value corresponding to the client computer 102-A to the Client Module 118. The Client Module 118 sends an "update (entries[ ])" message to the Broadcast Module 132. The Broadcast Module 132 returns a current list of the user's entry values, "currentEntryValues[ ]" to the Client Module 118. Specifically, the Broadcast Module 132 sends a list of the user's updated entry values to the Client Module 118. The Client Module 118 then initiates a "store(entryValue)" 168 operation to store the user's updated entry values in the Client Browser 120. The Client Module 118 then sends the updated entry values to all the applications that have requested subscription to the data entry values via a notification message, "notify(entryValue)" 170. A sequence of operations similar to those illustrated in FIG. 3 are then performed to service subsequent online requests from an application. Specifically, the Client Module 118 sends a subscription request message, "subscribe(entries)" 172 to the Broadcast Module 132. The Broadcast Module 132 sends a notification message, "notify (entryValue)" 174 to the Client Module 118. The Client Module 118 notifies all applications of the entry value if the entry value stored in the Client Browser 120 is different from the entry value received from the Broadcast Module 132 via a "notify(entryValue)" notification message 176. The Client Module 118 stores the entry value in the Client Browser 120 via a "store (entryValue)" 178 operation.

The various interactions of the modules illustrated in FIGS. 2-4 are better appreciated in connection with FIGS. 5-9. FIGS. 5-9 are exemplary screen displays illustrating dynamic data coordination between multiple applications displayed in a user interface, in accordance with one embodiment of the present invention. In the screen display illustrated in FIG. 5, a user selects a particular date entry, Feb. 11, 2008 (an input) 181 from a first application 180 and a particular location entry, Santa Cruz A (another input) 183 from a second application 182 displayed in a first user interface panel. As illustrated, information derived from the user's selections is simultaneously displayed in an application 184 in a second user interface panel. In other words, data computations resulting from the user's date entry selection in application 180 and location entry selection in application 182 are dynamically displayed in application 184.

Figure 6:
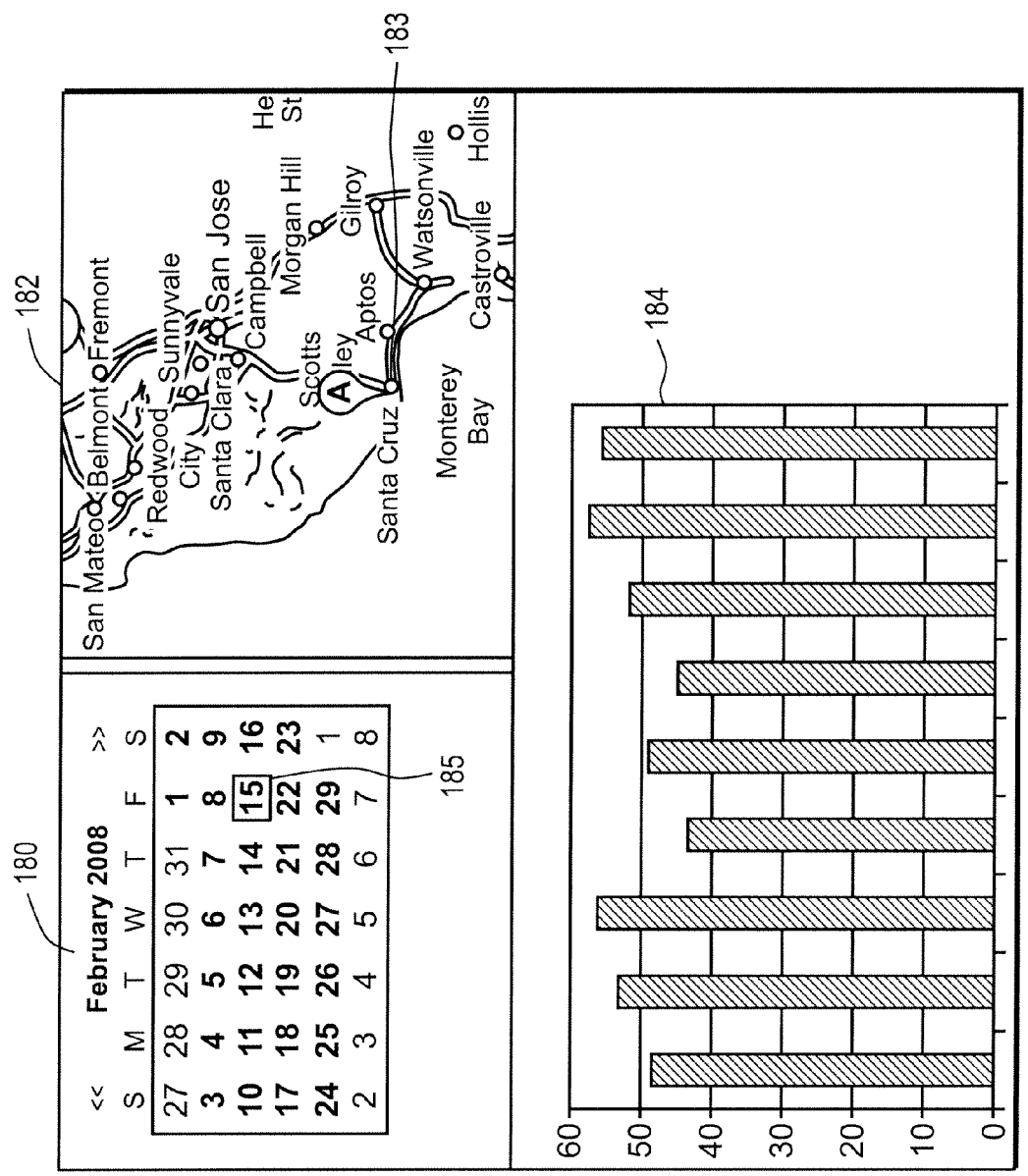
Figure 7:
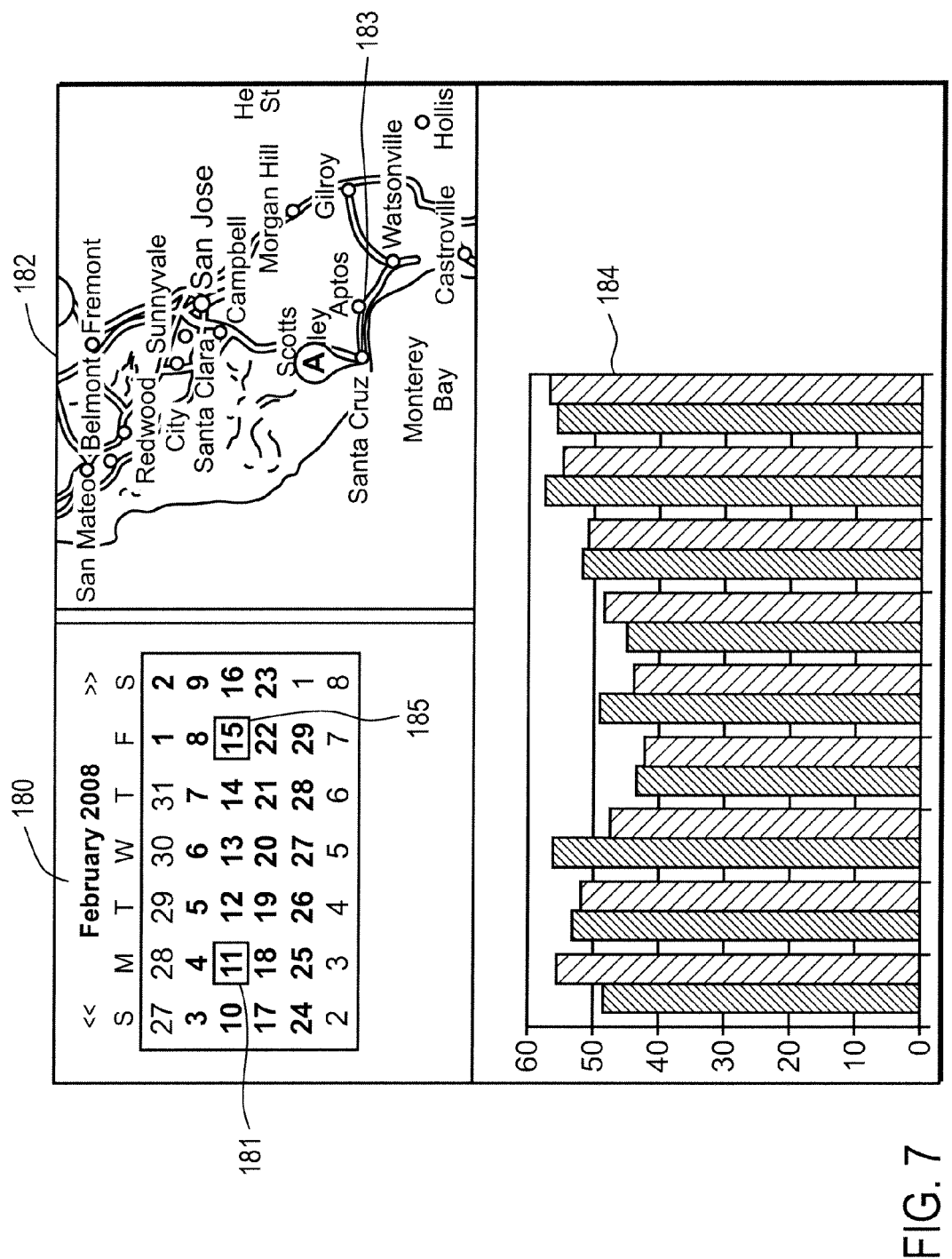
Figure 8:
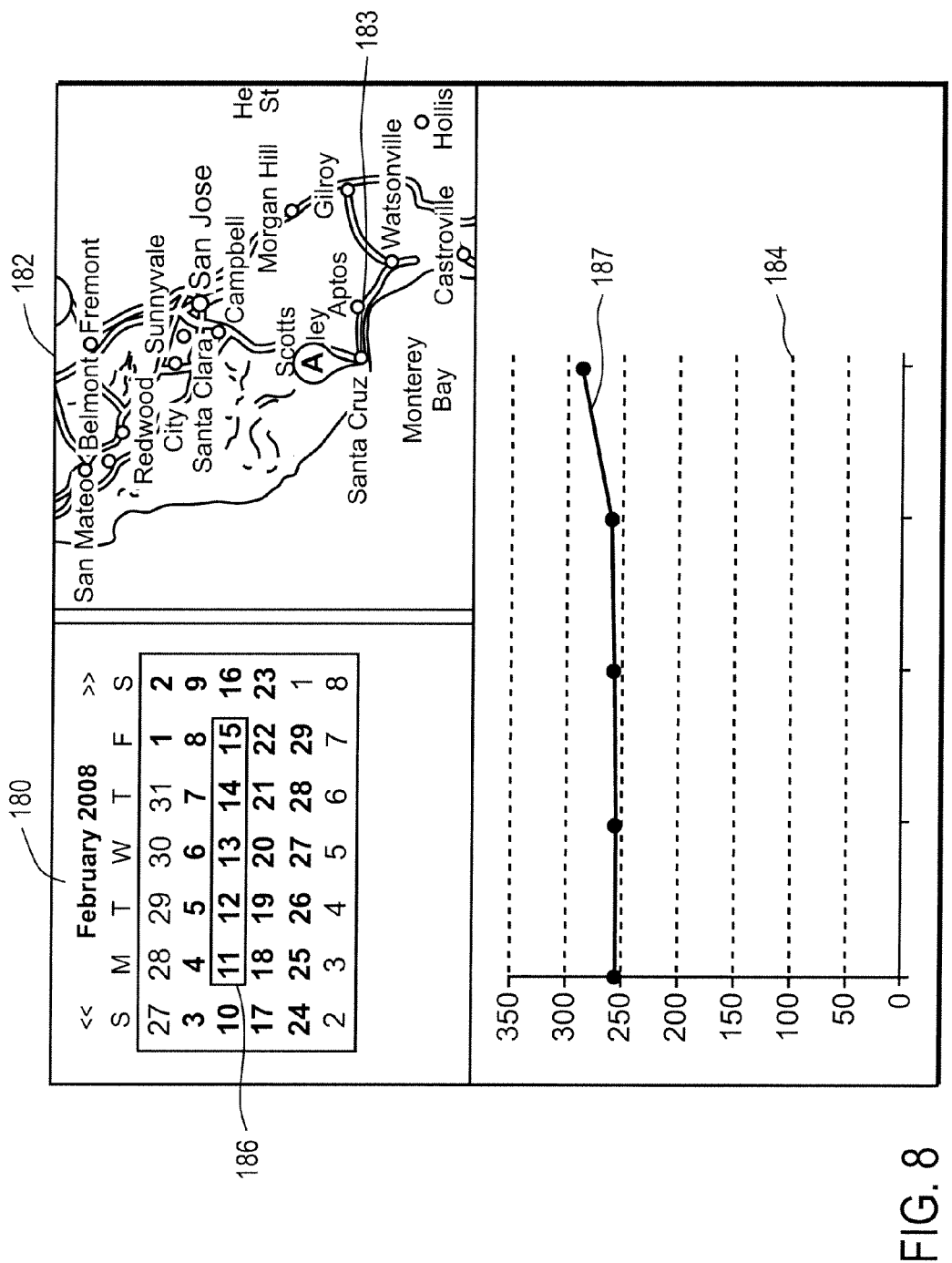
Figure 9:
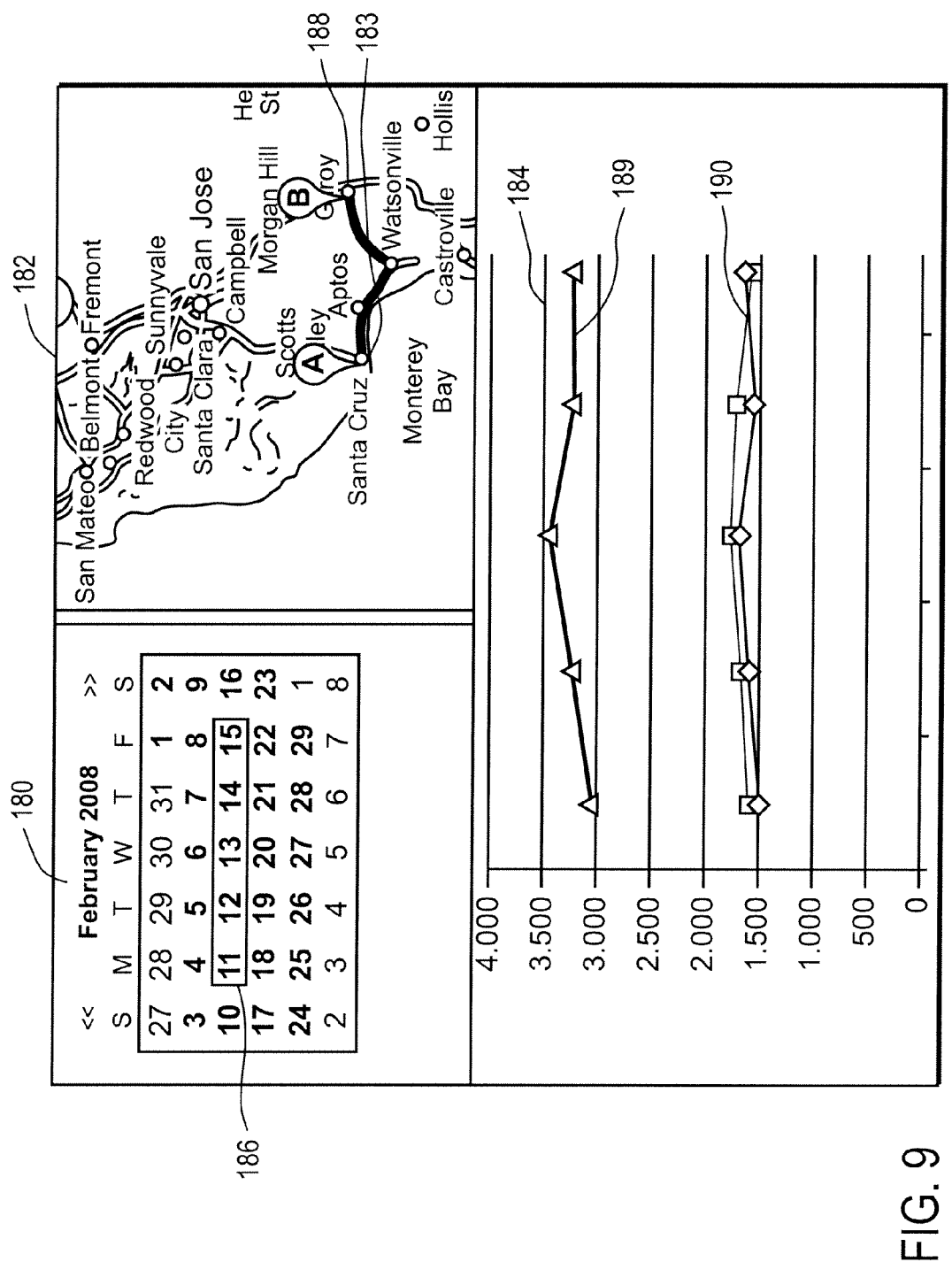

In the screen display illustrated in FIG. 6, a user selects a different date entry, Feb. 15, 2008 (an input) 185 from application 180. Observe that information resulting from the user's updated selection is dynamically reflected in application 184. In the screen display illustrated in FIG. 7, a user simultaneously selects two date entries, 181 and 185 from application 180 and a location entry 183 from application 182. Data computations resulting from the user's updated selections are dynamically displayed in application 184. In the screen display illustrated in FIG. 8, a user selects a range of date entries 186 from application 180 and a location entry 183 from application 182. Note that application 184 now displays information as a line graph 187 in accordance with the data computations resulting from the user's data entry selections. In the screen display illustrated in FIG. 9, a user selects a range of date entries 186 from application 180 and two locations entries 183, 188 from application 182. Observe, that in this case, application 184 displays information as two line graphs 189, 190 in accordance with the data computations resulting from the user's data entry selections.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method for implementation by one or more data processors forming part of at least one computing system, the method comprising:

receiving, at a client module implemented by at least one computing system from at least one application, a subscription request to data entries from a user;

transmitting, by the client module to a client browser module being implemented by at least one computing system, a fetch entry command to retrieve entry values stored for the user;

receiving, by the client module from the client browser module, the entry values stored for the user;

sending, by the client module to the at least one application, the entry values received from the browser module, via a notification message;

sending, by the client module to a broadcast module being implemented by at least one computing system, a subscription request message requesting subscription to entry values corresponding to the user, via a first notification message;

receiving, by the client module from the broadcast module, the entry values corresponding to the user, via a second notification message;

determining, by the client module, that the entry values received from the broadcast module differ from the entry values stored in the client browser module; and issuing, by the client module, a command to the client browser module to store new entry values for the entry values and sending, by the client module, the new entry values to all applications that have requested subscription to the entry values, via a subscription message.

2. A method as in claim 1, wherein the client modules stores metadata characterizing a user comprising one or more data entry fields and corresponding values.

3. A method as in claim 1, wherein the client browser module stores input received from the user at the at least one application.

4. A method as in claim 1, wherein the broadcast module stores metadata characterizing a set of users comprising one or more data entry fields and corresponding values.

5. A method as in claim 1, wherein the application receives input from the user, the application routes the input to the client module, the input is displayed in a first user interface panel associated with the application via the client browser, the client module routes the input to the broadcast module, the broadcast modules routes the input received from the client module to every subscribing application, and the client browser simultaneously displays, with the first user interface panel, at least one other interface panel corresponding to at least one other subscribing application that displays information derived from the input.

6. A non-transitory computer readable storage medium comprising executable instructions to cause at least one data processor forming part of at least one computing system to perform operations comprising:
- receiving, at a client module implemented by at least one computing system from at least one application, a subscription request to data entries from a user;
- transmitting, by the client module to a client browser module being implemented by at least one computing system, a fetch entry command to retrieve entry values stored for the user;
- receiving, by the client module from the client browser module, the entry values stored for the user;
- sending, by the client module to the at least one application, the entry values received from the browser module, via a notification message;
- sending, by the client module to a broadcast module being implemented by at least one computing system, a subscription request message requesting subscription to entry values corresponding to the user, via a first notification message;
- receiving, by the client module from the broadcast module, the entry values corresponding to the user, via a second notification message;
- determining, by the client module, that the entry values received from the broadcast module differ from the entry values stored in the client browser module; and
- issuing, by the client module, a command to the client browser module to store new entry values for the entry values and sending, by the client module, the new entry values to all applications that have requested subscription to the entry values, via a subscription message.

7. A non-transitory computer readable storage medium as in claim 6, wherein the client modules stores metadata characterizing a user comprising one or more data entry fields and corresponding values.

8. A non-transitory computer readable storage medium as in claim 6, wherein the client browser module stores input received from the user at the at least one application.

9. A non-transitory computer readable storage medium as in claim 6, wherein the broadcast module stores metadata characterizing a set of users comprising one or more data entry fields and corresponding values.

10. A non-transitory computer readable storage medium as in claim 6, wherein the application receives input from the user, the application routes the input to the client module, the input is displayed in a first user interface panel associated with the application via the client browser, the client module routes the input to the broadcast module, the broadcast modules routes the input received from the client module to every subscribing application, and the client browser simultaneously displays, with the first user interface panel, at least one other interface panel corresponding to at least one other subscribing application that displays information derived from the input.

11. A system comprising:
- at least one data processor forming part of at least one computing system; and
- memory storing instructions, which when executed, result in the at least one or more data processors performing operations comprising:
  - receiving, at a client module implemented by at least one computing system from at least one application, a subscription request to data entries from a user;
  - transmitting, by the client module to a client browser module being implemented by at least one computing system, a fetch entry command to retrieve entry values stored for the user;
  - receiving, by the client module from the client browser module, the entry values stored for the user;
  - sending, by the client module to the at least one application, the entry values received from the browser module, via a notification message;
  - sending, by the client module to a broadcast module being implemented by at least one computing system, a subscription request message requesting subscription to entry values corresponding to the user, via a first notification message;
  - receiving, by the client module from the broadcast module, the entry values corresponding to the user, via a second notification message;
  - determining, by the client module, that the entry values received from the broadcast module differ from the entry values stored in the client browser module; and
  - issuing, by the client module, a command to the client browser module to store new entry values for the entry values and sending, by the client module, the new entry values to all applications that have requested subscription to the entry values, via a subscription message.

12. A system as in claim 11, wherein the client modules stores metadata characterizing a user comprising one or more data entry fields and corresponding values.

13. A system as in claim 11, wherein the client browser module stores input received from the user at the at least one application.

14. A system as in claim 11, wherein the broadcast module stores metadata characterizing a set of users comprising one or more data entry fields and corresponding values.

15. A system as in claim 11, wherein the application receives input from the user, the application routes the input to the client module, the input is displayed in a first user interface panel associated with the application via the client browser, the client module routes the input to the broadcast module, the broadcast modules routes the input received from the client module to every subscribing application, and the client browser simultaneously displays, with the first user interface panel, at least one other interface panel corresponding to at least one other subscribing application that displays information derived from the input.

* * * * *